United States Patent
Jiang et al.

(10) Patent No.: US 12,328,685 B2
(45) Date of Patent: Jun. 10, 2025

(54) SELECTIVE DIRECT INCREASE OF TRANSMIT POWER LEVEL OF A WIRELESS COMMUNICATION DEVICE TO A MAXIMUM POWER LEVEL BASED ON DETECTED ACTIVITY MODE OR RECEIVED SIGNAL QUALITY

(71) Applicant: GOOGLE LLC, Mountain View, CA (US)

(72) Inventors: Qi Jiang, Mountain View, CA (US); Xuemei Ouyang, Mountain View, CA (US); Sriram Sundararajan, Mountain View, CA (US); Srenik Mehta, Fremont, CA (US); Omar El Ayach, Mountain View, CA (US); Nihar Jindal, Mountain View, CA (US); Daniel Barros, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 338 days.

(21) Appl. No.: 17/784,701

(22) PCT Filed: Dec. 9, 2020

(86) PCT No.: PCT/US2020/063982
§ 371 (c)(1),
(2) Date: Jun. 13, 2022

(87) PCT Pub. No.: WO2021/133551
PCT Pub. Date: Jul. 1, 2021

(65) Prior Publication Data
US 2023/0025342 A1   Jan. 26, 2023

Related U.S. Application Data

(60) Provisional application No. 62/953,303, filed on Dec. 24, 2019.

(51) Int. Cl.
*H04W 52/36* (2009.01)
*H04W 52/24* (2009.01)
(Continued)

(52) U.S. Cl.
CPC ....... *H04W 52/367* (2013.01); *H04W 52/245* (2013.01); *H04W 52/28* (2013.01); *H04W 76/10* (2018.02)

(58) Field of Classification Search
CPC . H04W 52/367; H04W 52/245; H04W 52/28; H04W 76/10
(Continued)

(56) References Cited

U.S. PATENT DOCUMENTS 8,655,400 B2   2/2014   Kadous et al.
10,157,363 B2  12/2018  Skaaksrud
(Continued)

FOREIGN PATENT DOCUMENTS

CN   103052148 A  *  4/2013   .......... H04W 52/383
CN   106303933 A      1/2017
(Continued)

OTHER PUBLICATIONS

International Search Report and Written Opinion mailed Apr. 20, 2021 for corresponding International Application No. PCT/US2020/063982, 25 pages.
(Continued)

*Primary Examiner* — Mong-Thuy T Tran

(57) ABSTRACT

A communication device comprises one or more sensors configured to generate sensor data, a wireless interface, and a processor. The wireless interface is configured to establish a connection with a remote device according to a short-range wireless communication protocol and to transmit one or more signals to the remote device, the one or more signals representing information configured according to a media
(Continued)

format. The processor is configured to determine at least one activity mode based on the sensor data from the one or more sensors on at least one of the communication device or the remote device, and during the transmission of the one or more signals, control the wireless interface to increase a transmit power level to a maximum transmit power level based on the determined activity mode.

19 Claims, 5 Drawing Sheets

(51) Int. Cl.
*H04W 52/28* (2009.01)
*H04W 76/10* (2018.01)

(58) Field of Classification Search
USPC .......................................... 455/41.2
See application file for complete search history.

(56) References Cited

U.S. PATENT DOCUMENTS

| | | | | |
|---|---|---|---|---|
| 10,966,161 | B2* | 3/2021 | Othman | H04W 52/362 |
| 12,127,138 | B2* | 10/2024 | Wang | H04W 52/0245 |
| 2004/0242258 | A1 | 12/2004 | Kim | |
| 2010/0091714 | A1 | 4/2010 | Bennett | |
| 2014/0113557 | A1* | 4/2014 | Jain | H04N 21/00 |
| | | | | 455/41.2 |
| 2014/0194062 | A1* | 7/2014 | Palin | H04W 24/00 |
| | | | | 455/67.11 |
| 2014/0328488 | A1 | 11/2014 | Caballero et al. | |
| 2015/0296460 | A1 | 10/2015 | Lee et al. | |
| 2017/0064643 | A1 | 3/2017 | Braun et al. | |
| 2017/0179988 | A1* | 6/2017 | Caballero | H04B 1/385 |
| 2018/0199214 | A1* | 7/2018 | Shen | H04W 4/80 |
| 2019/0132806 | A1 | 5/2019 | Kumar et al. | |
| 2019/0373490 | A1 | 12/2019 | Rahmati et al. | |
| 2022/0346159 | A1* | 10/2022 | Zhu | H04W 4/80 |
| 2022/0408505 | A1* | 12/2022 | Zhu | H04W 4/80 |
| 2023/0269672 | A1* | 8/2023 | Wang | H04W 52/245 |
| | | | | 455/522 |

FOREIGN PATENT DOCUMENTS

| | | |
|---|---|---|
| CN | 108055065 A | 5/2018 |
| EP | 3478003 B1 | 6/2020 |

OTHER PUBLICATIONS

Translation of Chinese First Office Action mailed Feb. 5, 2024 for CN Application No. 202080068242.8, 36 pages.
International Preliminary Report on Patentability mailed Jul. 7, 2022 for corresponding International Application No. PCT/US2020/063982, 17 pages.
Translation of Chinese Second Office Action for CN Application No. 202080068242.8 mailed Sep. 23, 2024, 34 pages.

* cited by examiner

SELECTIVE DIRECT INCREASE OF TRANSMIT POWER LEVEL OF A WIRELESS COMMUNICATION DEVICE TO A MAXIMUM POWER LEVEL BASED ON DETECTED ACTIVITY MODE OR RECEIVED SIGNAL QUALITY

CROSS-REFERENCE TO RELATED APPLICATIONS

The present application is a U.S. National Stage application under 35 U.S.C. § 371 of International Patent Application Serial No. PCT/US2020/063982, entitled "SELECTIVE DIRECT INCREASE OF TRANSMIT POWER LEVEL OF A WIRELESS COMMUNICATION DEVICE TO A MAXIMUM POWER LEVEL BASED ON DETECTED ACTIVITY MODE OR RECEIVED SIGNAL QUALITY" and filed on 9 Dec. 2020, which claims priority to U.S. Provisional Application No. 62/953,303, entitled "Apparatus and Methods for Controlling a Transmit Power Level" and filed on 24 Dec. 2019, the entireties of which are incorporated by reference herein.

BACKGROUND

Bluetooth® and other wireless personal area network (WPAN) technologies allow for wireless communication between various personal user devices, such as between mobile phones and wireless headsets or earpieces, for uni-directional or bi-directional streaming of audio content, video content, and the like. For example, the Bluetooth® Advanced Audio Distribution Profile (A2DP) specification defines protocols and procedures for distributing high-quality audio content in mono or stereo from one device to another over a Bluetooth® WPAN connection.

SUMMARY OF EMBODIMENTS

The present disclosure provides example methods and devices to control the transmit power level of a wireless communication device. For example, the wireless communication device may adjust (e.g., increase or decrease) the transmit power level for outputting or transmitting signals to a remote device (e.g., a wireless headset). In one implementation, the wireless communication device may increase the transmit power level for outputting signals to a maximum transmit power level based on a detected activity mode representative of an activity or motion in which at least one of the wireless communication device or the remote device is involved. That is, the wireless communication device can directly increase the transmit power to a maximum transmit power level without incrementally increasing the transmit power level over a period of time based on the detected activity mode. In other embodiments, the wireless communication device utilizes a received signal strength indicator from the remote device and which indicates a strength of the one or more signals transmitted by the wireless communication device as received at the remote device. Based on this received signal strength indicator the wireless communication device can selectively increase the transmit power of the wireless interface to the specified maximum transmit power level.

In one aspect, a method performed at a communication device includes establishing, via a wireless interface, a connection with a remote device based on a short-range wireless communication protocol, and controlling, by a processor, the wireless interface to transmit one or more signals for receipt by the remote device, the one or more signals comprising information configured according to a media format. The method further includes determining, by the processor, at least one activity mode based on sensor data from one or more sensors of at least one of the communication device or the remote device. The method also includes, during transmission of the one or more signals, controlling, by the processor, the wireless interface to increase a transmit power level for the one or more signals to a specified maximum transmit power level based on the determined activity mode. In some embodiments, the at least one activity mode includes a mode indicative of at least one of walking, jogging, running, cycling, skiing, or skating. Further, in some embodiments, the at least one activity mode includes a mode indicating placement of the communication device in a pocket or bag of a user. In some embodiments, the method further includes receiving, via the wireless interface, a signal strength measurement associated with at least one of the one or more signals received by the remote device, and wherein controlling the wireless interface to increase the transmit power level to the specified maximum transmit power level is further based on a comparison of the signal strength measurement to a specified signal strength threshold value. The signal strength measurement can include at least one of a received signal strength indicator (RSSI) measurement, a Signal to Interference and Noise Ratio (SINR) measurement, or a Negative Acknowledgment (NACK) value. In some embodiments, controlling the wireless interface to increase the transmit power level to the specified maximum transmit power level comprises controlling the wireless interface to increase the transmit power to the specified maximum transmit power in response to the comparison indicating that the signal strength measurement is not greater than the specified signal strength threshold value.

In accordance with another aspect, a method performed at a communication device includes establishing, via a wireless interface, a connection with a remote device based on a short-range wireless communication protocol. The method further includes controlling, by a processor, the wireless interface to transmit one or more signals for receipt by the remote device, the one or more signals comprising information configured according to a media format, and receiving, via the wireless interface, a signal strength measurement associated with at least one of the one or more signals received by the remote device. The method further includes controlling, by the processor, the wireless interface to increase the transmit power level to the specified maximum transmit power level based on a comparison of the signal strength measurement to a specified signal strength threshold value. In some embodiments, the signal strength measurement includes at least one of a received signal strength indicator (RSSI) measurement, a Signal to Interference and Noise Ratio (SINR) measurement, or a Negative Acknowledgment (NACK) value. In some embodiments, controlling the wireless interface to increase the transmit power level to the specified maximum transmit power level includes controlling the wireless interface to increase the transmit power to the specified maximum transmit power in response to the comparison indicating that the signal strength measurement is not greater than the specified signal strength threshold value.

In accordance with any of the preceding aspects, the sensor data can include at least one of location data, orientation data, position data, proximity data, velocity data, acceleration data, angular speed data, a battery. Further, controlling the wireless interface to increase the transmit power level to the specified maximum transmit power level can be further based on at least one of network congestion, signal interference, or a battery level.

In accordance with any of the preceding aspects, the method further can include determining, by the processor, at least one of orientation information, position information, velocity information, acceleration information, location information, proximity information, angular speed information, battery level information, network interference information for the communication device based on the sensor data. Further, the method can also include conditioning the control of the wireless interface to increase the transmit power level to the maximum transmit power level based on a battery level of the communication device.

In accordance with any of the preceding aspects, the remote device comprises at least one of a wireless headset, a wireless earpiece, or a wireless speaker, and the information comprises multimedia data, and wherein the one or more sensors include at least one of a light sensor, a gyroscope sensor, an accelerometer, a proximity sensor, or a satellite-based positioning sensor. Further, at least a portion of the sensor data can be sensor data captured by the one or more sensors during at least one activity or motion performed by a user of at least one of the communication device or the remote device.

In accordance with yet another aspect, a communication device is configured to perform the method of any preceding aspect. The communication device includes a wireless interface and a processor coupled to the wireless interface, and further may include at least one sensor of the one or more sensors. In another aspect, a non-transitory computer-readable medium stores a set of executable instructions, the set of executable instructions to manipulate a processor and a wireless interface of a communication device to perform any of the preceding methods.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for the purpose of explanation, several embodiments of the subject technology are set forth in the following figures.

DETAILED DESCRIPTION

Figure 1:
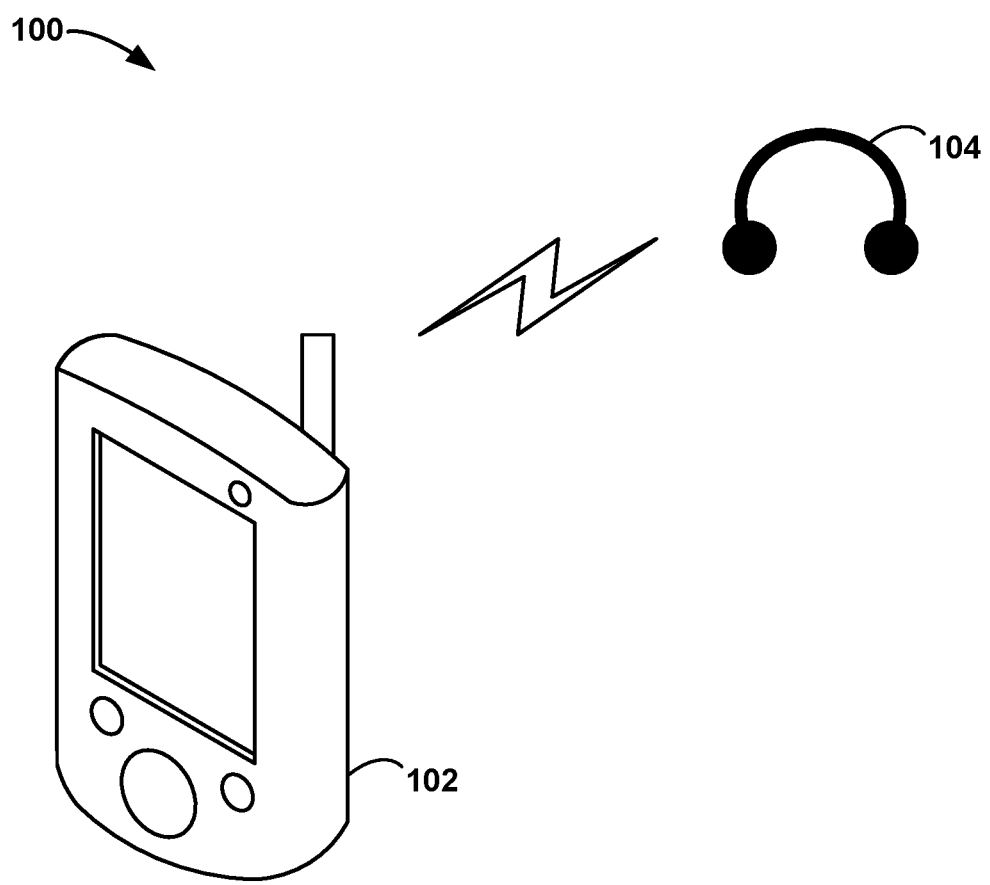
FIG. 1 illustrates an example communication system according to embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Mobile phones and other similar user electronic devices are typically equipped to automatically re-route multimedia signals (e.g., audio or video signals) in the event that the quality level of the signals sent over a link degrades below a pre-established threshold. For example, if multimedia signals received by a wireless headset from the mobile phone degrade to a particular quality level while the user is on a phone call or listening to music, the multimedia signal may be automatically re-routed the multimedia signals to an output (e.g., a speaker) of the mobile phone or to another device connected to the mobile phone via a link or connection. To illustrate, when a user is using a wireless headset for a phone call and the quality level of the audio transmitted from the mobile phone to the headset degrades to a particular quality level, the audio may be re-routed to an output of the mobile device, presenting a situation that may be quite unexpected and confusing to the user. If the user does not realize what has happened, the user may think that the call has been prematurely disconnected.

In order to reduce the possibility of multimedia signals being re-routed because of the quality level of the signals transmitted over a link, the transmit power level of the mobile phone may be adjusted based on feedback information from the wireless headset. For example, certain Bluetooth® specifications provide for the use of a closed-loop transmission power control (TPC) to adjust the transmit power level of a mobile device in a series of incremental steps. The closed-loop TPC is generally based on feedback information periodically transmitted to the mobile device from a wireless headset. However, the closed-loop TPC of the mobile device may not be very sensitive to measurement and transmit power setting errors because the power control may only be based on signal feedback from the wireless headset. The closed-loop TPC may also be relatively slow to adjust the transmission power level to an acceptable level since the power level may only be changed (e.g., increased or decreased) in incremental steps. Further, the closed-loop TPC may degrade the performance of the mobile device when the quality level of the link or connection is not improved because feedback information is not available due to transmission pauses.

The present disclosure provides methods and devices to control the transmit power level of a wireless communication device to rapidly and effectively respond to changing transmission conditions. In some embodiments, the wireless communication device adjusts (increase and/or decrease) the transmit power level of a wireless interface for outputting or transmitting signals to a remote device based on a detected activity mode, which represents one or more activities or motions of a user, the wireless communication device, the remote device, or a combination thereof. In one implementation, the wireless communication device may directly increase the transmit power level for transmitting signals to a maximum transmit power level. For example, the transmit power level of the wireless communication device may be increased to the maximum level without incrementally increasing the transmit power level over a period of time. Accordingly, reference herein to increasing the transmit power of a wireless interface to a specified maximum transmit power is a reference to the direct increase to this maximum transmit power without incremental increases and evaluation after each incremental increase.

The wireless communication device may be configured to transmit or stream multimedia signals (e.g., audio signals) to the remote device, such as Bluetooth® enabled headsets. For example, a user of a wireless communication device may use a media player application provided by the user's wireless communication device to listen to music. The wireless communication device transmits the multimedia files associated with the music to the remote device. The remote device receives and processes the multimedia signals from the wireless communication device and may output the processed multimedia signals (e.g., audio signals) to a user via an output (e.g., speaker).

In some embodiments, the wireless communication device is configured to determine when multimedia signals are being transmitted or streamed to a remote device and to adjust the transmit power of a wireless interface that is transmitting such signals based on a detected activity mode of one or both of the wireless communication device or the remote device, the activity mode representing one or more activities or motions of a user, the wireless communication device, the remote device, or a combination thereof. For example, while the multimedia signals are being transmitted by the wireless communication device to the remote device, the wireless communication device may collect and evaluate sensor data from one or more sensors of the wireless communication device and/or the remote device. In particular, the wireless communication device may include a computing device to monitor and analyze sensor data associated with one or more activities or motions of the user, the wireless communication device, the remote device, or a combination thereof. The sensor data include the output of one or more sensors of the wireless communication device generated in response to activity or motion of the user and/or the wireless communication device. For example, the sensor data associated with the wireless communication device may include velocity information (e.g., linear speed or angular rotational speed), acceleration information (linear or rotational), location information, orientation information, battery capacity information, or a combination thereof. Similarly, the remote device may include a computing device to monitor and analyze sensor data associated with the one or more activities or motions of the user and/or the remote device. The sensor data include the output of one or more sensors of the remote device generated in response to one or more activities or motions of the user and/or the remote device. For example, the sensor data associated with the remote device may include velocity information, acceleration information, location information, orientation information, or a combination thereof. The remote device may send the sensor data of the remote device to the wireless communication device.

During the transmission of the multimedia signals by the wireless communication device to the remote device, the wireless communication device may determine the activity mode representative of one or more activities or motions of a user (e.g., walking, jogging, running, cycling, skiing, skating, or swimming), the wireless communication device (e.g., velocity, acceleration, location, and/or orientation), the remote device (e.g., velocity, acceleration, location, and/or orientation), or a combination thereof. Each potential activity/motion of the user may be associated with one or more sets of and/or ranges of sensor data. The current activity mode of the user may be determined by determining which, if any, of the potential activities/motions current sensor data corresponds to. For example, the wireless communication device may determine that a user of a wireless communication device is jogging when the sensor data indicates that the wireless communication device and/or the remote device is moving between 5 and 15 kilometers per hour and that a pattern of vibrations of the wireless communication device and/or the remote device is consistent with jogging motion. The wireless communication device may also determine other conditions or motions of the wireless communication device and/or the remote device that may be consistent with a user jogging. For example, the wireless communication device may determine that the wireless communication device is in a pocket or bag of the user based on sensor data indicating that the wireless communication device is in close proximity to the skin of the user, based on sensor data indicating that the front of the wireless communication device is facing the user or away from the user, and/or based on sensor data indicating that the user may not be holding the phone. The wireless communication device may also determine that the user is wearing the remote device based on sensor data received from the remote device (e.g., sensor data from a proximity sensor of the remote device).

The wireless communication device may be configured to determine that the user, the wireless communication device, and/or the remote device may be traveling in a vehicle, such as a car, a train, or an airplane, based on sensor data indicative of the speed and/or location of the wireless communication device and/or the remote device. Further, the wireless communication device and/or the remote device may determine the distance between the devices based on a signal strength of the signals received by the devices, a battery level or capacity, signal interference, and/or network congestion information.

The wireless communication device may be configured to adjust (e.g., increase and/or decrease) the transmit power level for transmitting signals to the remote device based on a determination of the activity mode representative of one or more activities or motions of the user, the wireless communication device, the remote device, or a combination thereof as described above. For example, when the multimedia signals are being streamed by the wireless communication device to the remote device, the wireless communication device may increase the transmit power level for outputting or transmitting signals to a maximum transmit power level in response to a determination of one or more activities or motions. While the transmit power level of the wireless communication device is at the maximum transmit power level and the wireless communication device is transmitting multimedia signals to the remote device, the wireless communication device may ignore or disregard any requests from the remote device to decrease the transmit power level. Further, the wireless communication device may send a message to the remote device including information to increase a transmit power level of the remote device to a maximum transmit power level.

The wireless communication device may be configured to adjust the transmit power level of the wireless communication device based on the quality level of the multimedia signals received by the remote device. For example, the wireless communication device may increase the transmit power level for outputting or transmitting signals to a maximum transmit power level when the quality level (e.g., signal strength) of the multimedia signals received by the remote device is equal to or less than a predetermined threshold. In particular, the remote device may be configured to determine a quality level of the multimedia signals received by the remote device from the wireless communication device. After the remote device determines the quality level of the multimedia signals received from wireless communication device, the remote device may send a message to the wireless communication device. The message may include information indicative of the quality level of the received multimedia signals.

The wireless communication device may receive the message from the remote device and use the information about the quality level of the multimedia signals to determine whether to adjust the transmit power level for wirelessly transmitting signals. For example, the wireless communication device may compare the quality level of the multimedia signals received by the remote device to a threshold quality level. If the quality level of multimedia signals is equal to or is less than the threshold quality level, the wireless communication device may increase the transmit power level for transmitting signals to a maximum transmit power level. By automatically increasing the transmit power level to a maximum transmit power level, the quality level of the multimedia signals received by the remote device can be quickly improved, thereby enhancing the user's experience. However, if the wireless communication device is operating in a low power mode or has a low battery level, the wireless communication device may increase the transmit power level to a power level other than the maximum transmit power level. Further, if the quality level of the multimedia signals received by the remote device is acceptable (that is, not less than a specified threshold quality level), the wireless communication device may decrease the transmit power level to save power.

The present disclosure may be more readily understood with reference to FIGS. 1-4, in which like reference numerals designate like items. FIG. 1 depicts an example communication system 100 in accordance with one implementation of the present disclosure. The communication system 100 includes a first communication device 102 (e.g., a mobile device) and a second communication device 104 (e.g., a wireless headset), with the second communication device 104 a remote device relative to the first communication device 102, and vice versa. The first communication device 102 may be a wireless communication device, such as a cellular telephone, a mobile phone, a smartphone, a two-way radio or pager, a wireless messaging device, a laptop or personal computer, a wireless automotive gateway, a wireless or wired residential gateway, a wireless or wired router, a set-top box, a personal digital assistant (PDA), a portable gaming device including a built-in wireless modem, or a combination of any of these communication devices or other communication devices. The communication system 100 may support any number of communication devices in the environment.

The first communication device 102 may be connected to (e.g., "paired with") the second communication device 104. For example, the first communication device 102 may communicate directly with the second communication device 104 via a wireless communication connection or link. The communication link may facilitate the exchange of signals transmitted according to one or more wireless communication standards or protocols including, for example, Bluetooth® communications, Wi-Fi communications (e.g., defined by the IEEE 802.11 standards), and/or other short-range communications.

In an illustrative implementation of the communication system 100 of FIG. 1, a high-quality audio streaming channel or a Bluetooth® connection may be established between the first and second communication devices 102 and 104 using, for example, an Advanced Audio Distribution Profile (A2DP) format. The first communication device 102 may transmit multimedia signals (e.g., audio signals) to the second communication device 104 using a Bluetooth® short-range transmission protocol. In an alternative implementation, the first communication device 102 may transmit the multimedia signals to the second communication device 104 over short-range wireless connections or links utilizing other WPAN standards or specifications.

The second communication device 104 may be configured to receive the multimedia signals from the first communication device 102. The second communication device 104 may include a wireless earpiece or headset, a wireless speaker, a wearable device, an automobile audio device, a computer system, a set-top box, or a television. In one embodiment, the second communication device 104 may include a wireless headset as shown in FIG. 1. The second communication device 104 may also be configured to receive, via a microphone, signals generated by a user (e.g., voice data) and to transmit the signals to the first communication device 102.

The first communication device 102 may also be configured to receive signals from the second communication device 104 and then transmit the signals to a base station (not shown) via communications using various modes or protocols, such as Long Term Evolution (LTE), Global System for Mobile communication (GSM), Short Message Service (SMS), Enhanced Messaging Service (EMS), Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

During operation of the communication system 100 according to one implementation, the first communication device 102 (e.g., mobile phone) may transmit multimedia signals (e.g., audio signals) to the second communication device 104 (e.g., wireless headset) over a Bluetooth® connection using the Advanced Audio Distribution Profile (A2DP) format or over a similar WPAN connection using a similar media format. The second communication device 104 may receive and process the multimedia signals from the first communication device 102 and may output the processed multimedia signals to a user via an output (e.g., speaker).

The first communication device 102 may be configured to receive and/or collect sensor data from one or more sensors. Such sensors can include cameras or other light sensors, depth sensors, accelerometers or other inertial management units (IMUs), global positioning system (GPS) or Global Navigation Satellite System (GNSS) sensors or other satellite-based location sensors, capacitive touch sensors or other user-proximity sensors, voltage sensors, and the like. The sensor data include the output of one or more sensors of the first communication device 102 generated in response to one or more activities or motions of a user and/or the first communication device 102. For example, the sensor data associated with the first communication device 102 may include velocity information, acceleration information, location information, orientation information, battery information, or a combination thereof. Similarly, the sensor data include the output of one or more sensors of the second communication device 104 generated in response to activity or motion of a user and/or the second communication device 104. For example, the sensor data associated with the second communication device 104 may include velocity information, acceleration information, location information, orientation information, or a combination thereof. Further, the wireless communication device and/or the remote device may determine the distance between the devices based on a signal strength indicator of the signals received by the devices.

During the transmission of the multimedia signals from the first communication device 102 to the second communication device 104, the first communication device 102 may determine when the multimedia signals are being transmitted to the second communication device 104 and evaluate sensor data associated with the first communication device 102 and/or the second communication device 104 to determine one or more activities or motions of a user (e.g., walking, jogging, running, skiing, skating, swimming, etc.), the first communication device 102 (e.g., velocity, acceleration, location, and/or orientation) and/or the second communication device 104 (e.g., velocity, acceleration, location, and/or orientation). For example, the first communication device 102 may determine that a user of the first communication device 102 is jogging based on the sensor data. The first communication device 102 may also determine that the first communication device 102 is in a pocket of the user based on the sensor data. Further, the first communication device 102 may determine that the user, the first communication device 102, and/or the second communication device 104 are traveling in a vehicle, such as a car, a train, or an airplane, based on sensor data indicative of the speed and/or location information of the wireless communication device 102 and/or the second communication device 104.

While the multimedia signals are being streamed from the first communication device 102 to the second communication device 104, the first communication device 102 may determine that multimedia signals are being streamed and adjust the transmit power level for outputting or transmitting signals to the second communication device 104 based on detection of an activity mode reflective of one or more activities or motions of the user, the wireless communication device, the remote device, or a combination thereof. The activity mode(s) of the user, the first communication device 102, and/or the second communication device 104 may be determined by the first communication device 102 based on sensor data. The sensor data may correspond to output of one or more sensors of the first communication device 102 and/or the second communication device 104 generated in response to the one or more activities or motions of a user, the first communication device 102, the second communication device 104, or a combination thereof.

In one implementation, the first communication device 102 increases the transmit power level for outputting or transmitting signals to a maximum transmit power level based on the multimedia signals received by the second communication device 104. For example, the first communication device 102 may increase the transmit power level for transmitting signals to a maximum transmit power level when the quality level (e.g., signal strength) of the multimedia signals received by the second communication device 104 is equal to or less than a predetermined signal strength threshold. The second communication device 104 may be configured to determine the quality level of the multimedia signals received from the first communication device 102 and send a message to the first communication device 102 indicating the quality level of the multimedia signals received by the second communication device 104.

The first communication device 102 may receive the message from the second communication device 104 and determine whether to adjust (e.g., increase and/or decrease) the transmit power level for transmitting signals based on the multimedia signals. For example, the first communication device 102 may compare the quality level of the multimedia signals received by the second communication device 104 to a threshold quality level. If the quality level of the multimedia signal received by the second communication device 104 is equal to or less than the threshold quality level and the first communication device 102 is streaming the multimedia signals to the second communication device 104, the transmit power level of the first communication device 102 may be increased to a maximum transmit power level. As such, the first communication device 102 may be configured to ignore or disregard requests from the second communication device 104 to decrease the transmit power level. By increasing the transmit power level to a maximum transmit power level, the quality of the multimedia signals received by the second communication device 104 can be quickly improved, thereby enhancing the user's experience. Additionally, when the first communication device 102 has increased the transmit power level for outputting signals to the maximum transmit power level, the first communication device 102 may send a message to the second communication device 104 requesting that the second communication device 104 increase the transmit power level for transmitting signals to a maximum transmit power level.

When the battery level of the first communication device 102 is low or the first communication device is operating in a low power mode, the first communication device may not increase the transmit power level for transmitting signals to the maximum transmit power level. Instead, the transmit power level of the first communication device may not be increased or may be increased to a level less than the maximum transmit power level. Further, when the quality level of the multimedia signals received by the second communication device 104 is satisfactory (e.g., exceeds the threshold quality value), the communication device 102 may decrease the transmit power level for transmitting signals to save power. That is, one or both of the first communication device 102 and the second communication device 104 may condition the increase of their respective transmit power on the battery power condition of the respective device.

Figure 2:
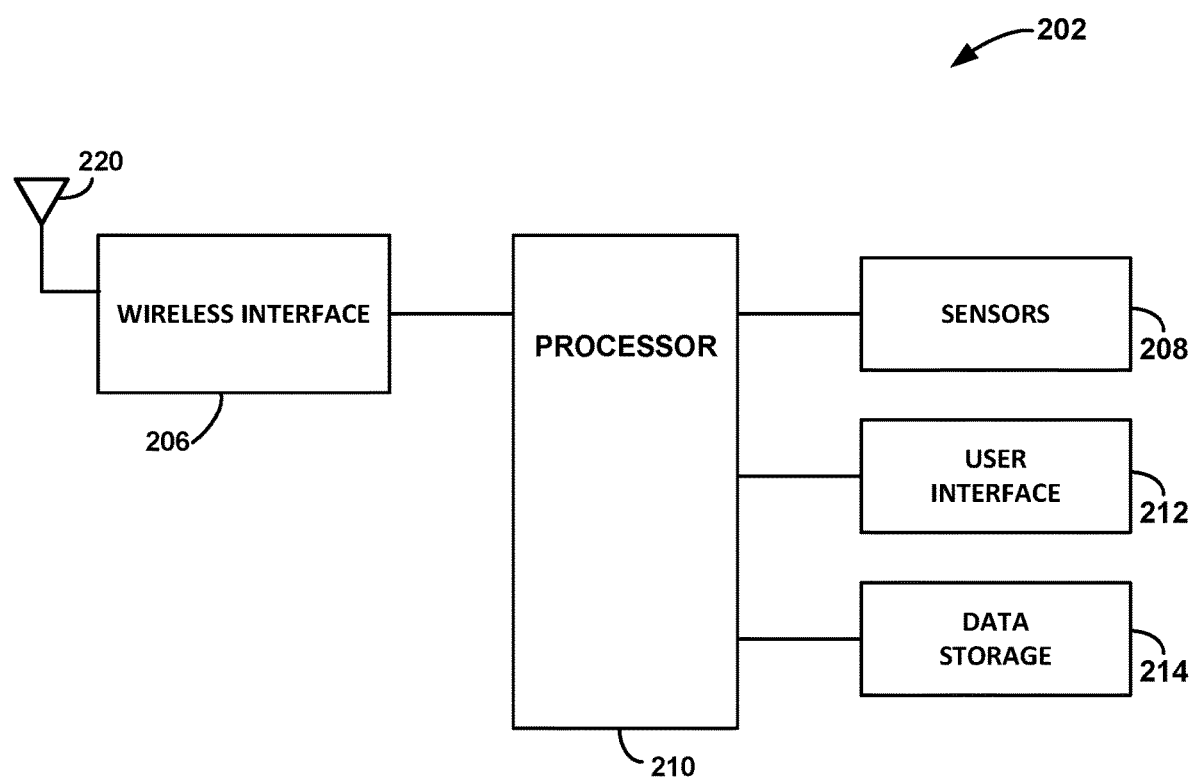
FIG. 2 is a block diagram illustrating one communication device of the communication system of FIG. 1 according to embodiments of the present disclosure.

FIG. 2 depicts a communication device 202 that is one embodiment of the first communication device 102 of FIG. 1. The communication device 202 includes a wireless interface 206 (which may include a transmitter, a receiver, or a combination thereof), sensors 208, a processor 210, a user interface 212, and data storage 214 (e.g., memory). Not all of the depicted components may be used, however, and one or more implementations may include additional components not shown in FIG. 2. Variations in the arrangement and type of the components may be made without departing from the scope of the subject technology. Additional components, different components, or fewer components may be provided.

The wireless interface 206 of the communication device 202 is coupled to, and controlled by, the processor 210. The wireless interface 206 may include one or more transceivers for transmitting and receiving signals over one or more wireless networks. For example, the wireless interface 206 may include a short-range transceiver configured to receive and transmit signals using a Bluetooth® communication protocol or other WPAN protocol. The wireless interface 206 may also include a long-range transceiver configured to receive and transmit signals using at least one communication system protocol, such as a cellular communication system protocol, the Apco 25 (Project 25) communication system protocol, IEEE 802.11 communication system protocol, HyperLAN protocol, or any other communication system protocol. The wireless interface 206 may also be coupled to, or include, one or more antennas 220 for receiving and radiating signals to and from the one or more transceivers of the wireless interface 206.

The sensors 208 of the communication device 202 may be in communication with the processor 210. The sensors 208 may be configured to capture information associated with the communication device 202 in response to one or more activities or motions of a user and/or the communication device 202. The sensors 208 may include one or more of Global Navigation Satellite System (GNSS) sensors, acceleration sensors, gyroscope sensors, proximity sensors, cameras, radar sensors, lidar sensors, or a combination thereof.

In one implementation, the sensors 208 may include one or more proximity sensors to detect conditions associated with the communication device 202 and provide proximity sensor data to the processor 210. For example, the one or more proximity sensors may include one or more motion sensors (e.g., ultrasonic, infrared, and/or optical proximity sensors) configured to sense or detect the presence of an object or user (e.g., portions of the body of a user, such as a hand or a leg) in proximity with the communication device 202. The one or more proximity sensors may also generate a magnitude value that indicates how close a user is to the communication device 202. For example, when the communication device 202 is worn on the body of the user, the proximity sensors may generate a signal indicating that the communication device 202 is within the proximity of the body of the user. Also, the one or more proximity sensors may include a light sensor (e.g., a photoresistor or a single-pixel sensor) that measures light.

The sensors 208 may also include one or more accelerometers that provide acceleration sensor data to processor 210. The one or more accelerometers may be used to measure static acceleration, such as the tilt of the communication device 202 relative to gravity, as well as dynamic acceleration, such as that resulting from motion, shock, or vibration of the communication device 202. For example, the one or more accelerometers may generate acceleration sensor data indicating acceleration (e.g., direction and magnitude of motion, velocity, and orientation) associated with the communication device. The sensors 208 may also include one or more gyroscopes that may generate sensor data indicating a current location or orientation of the communication device 202. Further, the sensors 208 may include one or more GNSS sensors that may generate location data, such as location coordinates.

The processor 210 of the communication device 202 is configured to control the operation of the communication device 202 according to computer instructions stored in the data storage 214, or alternatively, according to reprogrammable or hard-coded logic. The processor 210 may include one or more central processing units (CPUs), one or more general-purpose processors, and/or one or more dedicated processors (e.g., application-specific integrated circuits, digital signal processors, network processors, application processing units, etc.). In one implementation, the processor 210 may be configured to determine when multimedia signals are being transmitted or streamed to a remote device, such as a wireless headset.

The processor 210 may also be configured to process sensor data from the sensors 208, access the data storage 214, and communicate with the wireless interface 206 and the user interface 212. In one implementation, the processor 210 may be configured to determine activity or motion of a user and/or the communication device 202 based on the sensor data. The processor 210 may receive and process the sensor data that may include acceleration, motion, velocity, and orientation information associated with the communication device 202. The processor 210 may also receive sensor data that includes a location of the communication device 202 in relation to a user, object, and/or another device, such as in the user's hand, in the user's pants or chest pocket, in a purse, on a surface (e.g., a table), against or near the user's body, and/or against or near a user's ear.

The processor 210 may also be configured to determine a transmission power level to be implemented by the wireless interface 206 to transmit multimedia signals to a remote device based on sensor data received from one or more sensors 208. The processor 210 may provide a power control signal to the wireless interface 206 to adjust the transmit power level for transmitting signals to the remote device. For example, the processor 210 may send a power control signal to the wireless interface 206 to increase the transmit power level to a maximum transmit power level for outputting or transmitting signals (e.g., multimedia signals) to the remote device. Further, the communication device 202 may be configured to ignore or disregard requests from the remote device to decrease the transmit power level when the communication device is streaming or transmitting multimedia files (e.g., audio files). The processor 210 is also configured to send a message to the remote device including information to increase a transmit power level of the remote device to a maximum transmit power level.

In addition, the processor 210 may adjust the transmit power level of the communication device 202 based on the quality level of the multimedia signals transmitted to a remote device. For example, when the quality level of the multimedia signals (e.g., a signal strength indicator (RSSI) value, a Signal to Interference and Noise Ratio (SINR) value, a Negative Acknowledgment (NACK) value, or any other signal quality value) transmitted to and received by the remote device is less than a quality threshold, the processor 210 may be configured to cause the transmit power level for transmitting the multimedia signals to be increased to a maximum transmit power level. The processor 210 may receive a message from a remote device indicative of the quality level of the multimedia signals. The processor 210 may compare the quality level of the multimedia signal to a quality threshold level. If the quality level of the multimedia signals is equal to or less than the quality threshold level and the communication device 202 is streaming multimedia signals, the processor 210 may cause the transmit power level of the communication device 202 to be increased to a maximum transmit power level. In addition, the processor 210 may cause the transmit power level implemented by the wireless interface 206 to be increased to a maximum transmit power level based on a signal to noise ratio (SNR), a signal to interference ratio (SIR), battery level or capacity information, and/or network congestion information.

The user interface 212 of the communication device 202 may facilitate user interactions with the communication device 202 and may be in communication with the processor 210. For example, the user interface 212 may comprise multiple types of input devices, such as a keyboard, a microphone, a mouse, and a touch screen, to receive user inputs (e.g., voice). Similarly, the user interface 212 may comprise multiple types of output devices, such as a screen, a speaker, or one or more light-emitting diodes (LEDs), to output various sounds, such as voice or audio from audio multimedia files. The output of the user interface 212 may also visually display text and/or graphics to a user of the communication device 202.

The data storage 214 of the communication device 202 may include dynamic random-access memory (DRAM) and/or a read-only memory (ROM) that stores data and instructions that may be retrieved by the processor 210. For example, the data storage 214 may store program instructions, executable by the controller, and data that may be manipulated by the instructions to carry out the various methods, processes, or functions described herein. The data may also contain a plurality of multimedia files, which may include audio and/or video information. Additionally, or alternatively, the multimedia files may be stored in or on a removable storage media (e.g., a subscriber identity module (SIM) card, a memory stick, a USB flash drive, or any other portable data storage device), which also functions under the command of the controller.

Figure 3:
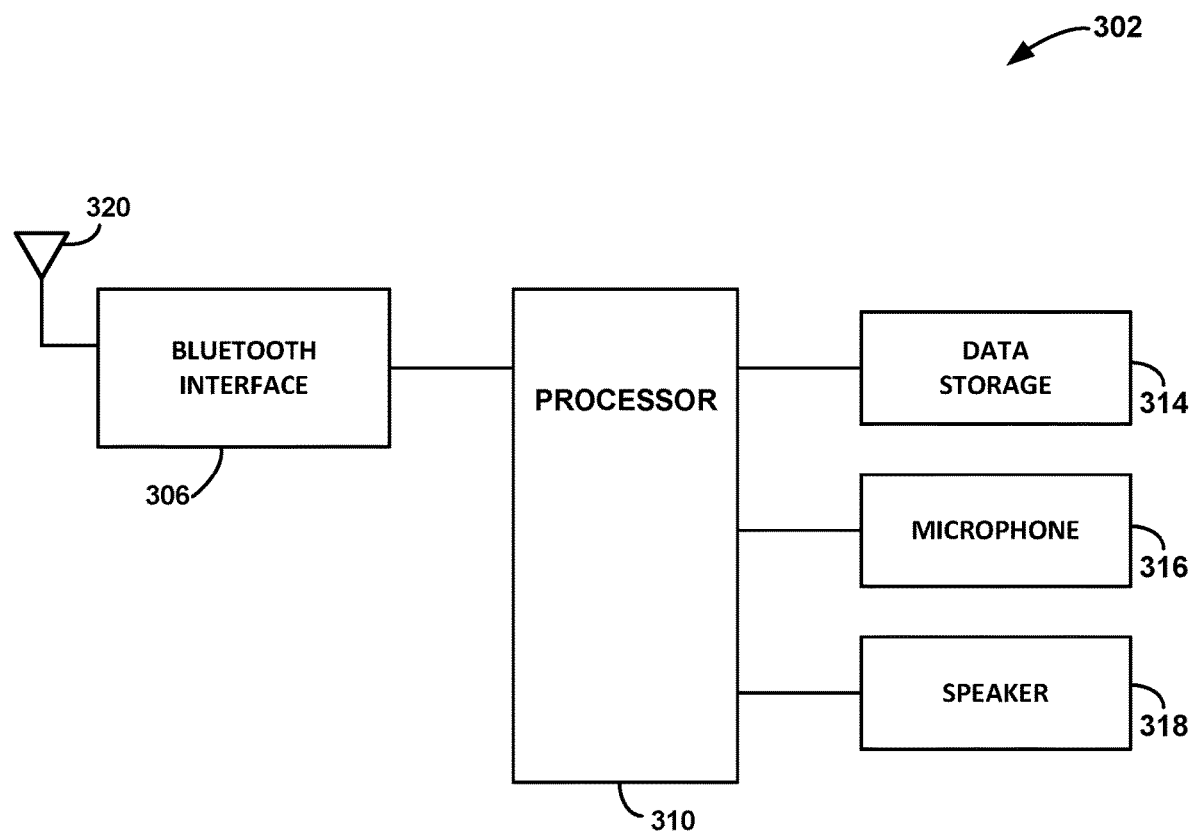
FIG. 3 is a block diagram illustrating another communication device of the communication system of FIG. 1 according to embodiments of the present disclosure.

FIG. 3 depicts a communication device 302 that is one embodiment of the communication device 104 of FIG. 1. The communication device 302 may include a Bluetooth® interface 306 (e.g., a transceiver, receiver, or transmitter), a processor 310, data storage 314 (e.g., memory), a microphone 316, and a speaker 318. The communication device 304 may also include sensors (not shown) (e.g., sensors 208 of the communication device 202 of FIG. 2) to detect and capture information associated with activities and/or motions of a user and/or the communication device 304. In one implementation, the communication device 302 may include a wireless headset or earpiece.

The communication device 302 may receive wireless data signals containing encoded multimedia information (e.g., audio data) via the Bluetooth® interface 306 or other short-range wireless interface. The multimedia information is decoded by the communication device 302 and stored temporarily in the data storage 314 before being output via a speaker 318. Likewise, audio signals coupled from a microphone 316 are transferred to the processor 310, and are then encoded by the communication device 304 for transmission to a remote device (e.g., a mobile phone) via an antenna 320.

The processor 310 may control the operation of the communication device 302 according to computer instructions stored in the data storage 314. The data storage 314 of the communication device 302 may include dynamic random-access memory (DRAM) and/or a read-only memory (ROM) that stores data and instructions that may be retrieved by the processor 310. For example, the data storage 314 may store program instructions, executable by the controller, and data that may be manipulated by the instructions to carry out the various methods, processes, or functions described herein.

The processor 310 may be configured to process the signals (e.g., multimedia signals) received by the communication device 302 and may evaluate the quality level of the received multimedia signals. In one embodiment, the processor 310 may determine or measure a quality level or value (e.g., an RSSI value, an SINR value, a NACK value, or any other signal quality value) associated with the multimedia signals received by the communication device 302.

In one implementation, the processor 310 may compare the quality level of the multimedia signals received from a remote device with a specified signal quality threshold level to determine whether the quality level of multimedia signals is acceptable. For example, if the quality level of the multimedia signals is equal to or less than the quality threshold value, the communication device 302 may communicate a message to the remote device. The message may include information to alert the remote device to increase the transmit power level to a maximum transmit power level. However, if the quality level of the multimedia signals is satisfactory, the communication device may send a message to the device to decrease the transmit power level in order for the remote device to save power.

Figure 4:
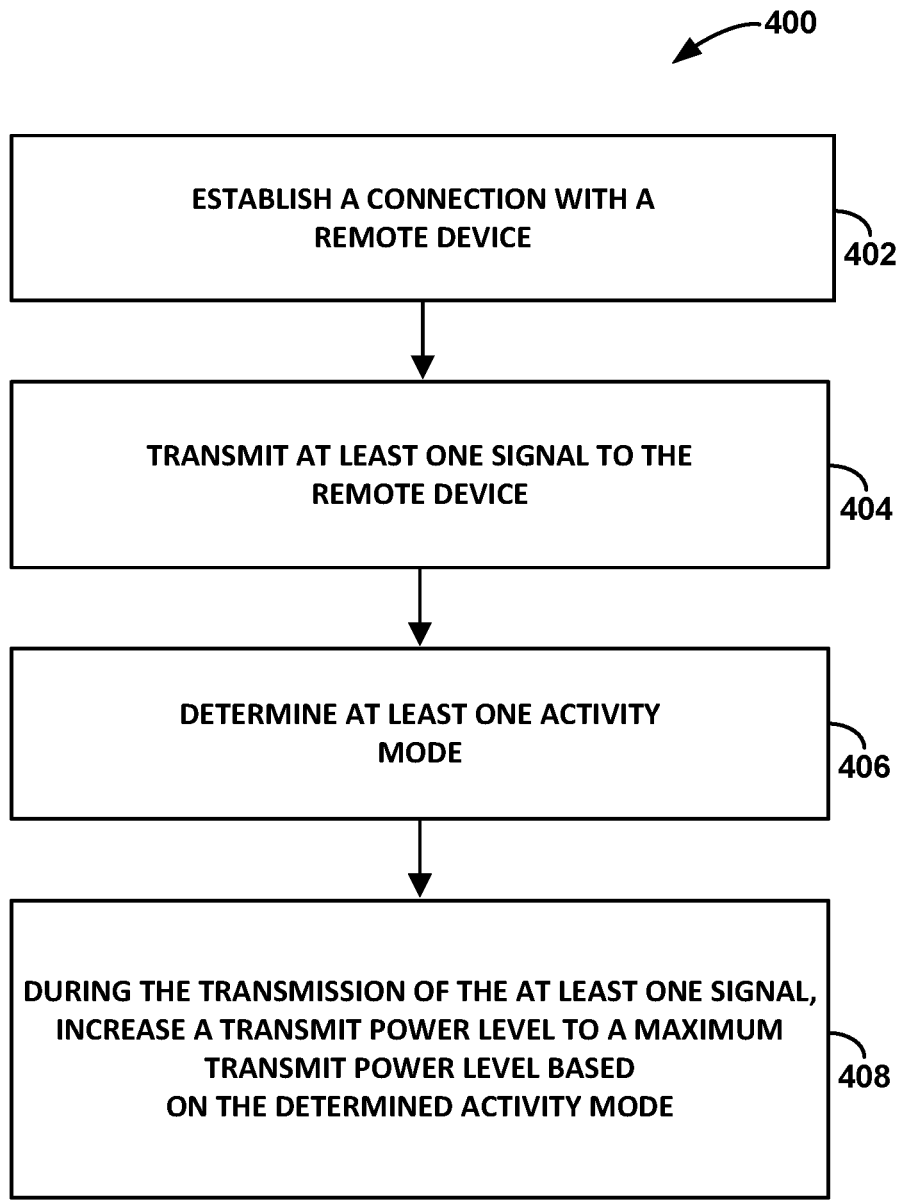
FIG. 4 is a flow chart illustrating a method for selective increase of transmit power by a communication device to a maximum transmit power based on detected activity mode according to embodiments of the present disclosure.

FIG. 4 illustrates an example operational flow diagram 400 for a method of controlling the transmit power level of a communication device, in accordance with one embodiment of the present disclosure. The operations shown in FIG. 4 could be executed by one or more communication devices, such as the first communication device 102 of FIG. 1. The operations may include one or more activities as illustrated by blocks 402 to 408. Although the blocks are illustrated in sequential order, these blocks may in some examples be performed in parallel, and/or in a different order than those described herein. Also, the various blocks may be combined into fewer blocks, divided into additional blocks, and/or removed based upon the directed implementation.

In addition, the operations show functionality of some example implementations. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device. In addition, one or more blocks in FIG. 4 may represent circuitry that is wired to perform the specific logical operations.

Referring now to FIG. 4, the flow diagram 400 operates from the perspective of the first communication device 102 (e.g., a mobile phone) of FIG. 1. Beginning at block 402, a communication device may establish, via its wireless interface, a wireless connection or link with a remote or peripheral device (e.g., a headset) over a short-range wireless link or connection, such as a Bluetooth® link. The link may be established according to a handshaking procedure to pair the communication device with the remote device as described in the Bluetooth® standards or other WPAN standards.

At block 404, the communication device may transmit or stream signals (e.g., multimedia signals) to a remote device via the wireless interface. For example, once the communication device establishes a connection with the remote device via a Bluetooth® connection, the communication device (e.g., a wireless communication device) may transmit one or more signals containing information (e.g., multimedia signals) encoded according to a media format to the remote device. The media format may include the Bluetooth® A2DP stereo format; however, any high-quality audio encoding format may be alternatively used. In one example embodiment, the communication device may be a mobile device and the remote device may be a wireless headset. In alternative embodiments, other devices, such as a wireless earpiece, a wireless speaker, a wearable device (e.g., a watch) and/or a wireless video monitor, may be used to implement the remote device.

At block 406, the communication device may be configured to determine at least one activity mode while the communication device is transmitting or streaming multimedia signals to a remote device. For example, the communication device may receive and evaluate sensor data to determine one or more activities or motions of a user (e.g., walking, jogging, running, cycling, skiing, skating, swimming), the communication device (e.g., velocity, acceleration, location, and/or orientation) and/or remote device (e.g., velocity, acceleration, location, and/or orientation). In particular, the communication device may determine that a user of the communication device is jogging based on the sensor data. The communication device may also determine other conditions of the communication device that may be consistent with a user jogging, such as the communication device placed in a pocket of the user. Further, the communication device may determine that the user, the communication device, and/or the remote device may be traveling in a vehicle, such as a car, train, or airplane based on geographic sensor data and motion sensor data.

At block 408, the communication device increases, during the transmission of the multimedia signals, the transmit power level implemented by the wireless interface of the communication device to a specified maximum transmit power level for outputting or transmitting multimedia signals to a remote device based on a determination of at an activity mode representative of activity or motion of a user of at least one of the communication device or remote device. The at least one activity or motion includes one or more activities or motions of a user (e.g., walking, jogging, running, skiing, skating, swimming), the communication device (e.g., velocity, acceleration, location, and/or orientation) and/or remote device (e.g., velocity, acceleration, location, and/or orientation). The communication device may determine the one or more activities or motions based on the sensor data associated with one or more sensors of the communication device and/or remote device.

The communication device may adjust (e.g., increase and/or decrease) the transmit power level of the communication device based on the one or more activities or motions of a user, the communication device, and/or a remote device. For example, the communication device may increase the transmit power level for outputting or transmitting signals to a specified maximum transmit power level in response to a determination of the determined activity mode and/or a determination that multimedia signals are being transmitted or streamed by the communication device. When the transmit power level of the communication device has been increased to maximum power, the communication device may send a message to the remote device including information to increase a transmit power level of the remote device to a maximum transmit power level. Further, the communication device may ignore or disregard requests from the remote device to decrease the transmit power level when the transmit power level of the communication device is at maximum transmit power level and/or the communication device is streaming multimedia signals to the remote device. In some implementations, the transmit power level of the communication device and/or the remote device may be increased (e.g., increase to a maximum level) based on a signal strength, a battery level or capacity, signal interference, network congestion information, a distance between the communication device and the remote device, or a combination thereof.

In some examples, determining when to trigger an increase in transmission power may involve the application of a machine learning model, such as a neural network. The machine learning model may be trained to take as input sensor data from one or more sensors on a mobile device, such as a proximity sensor and/or a motion sensor. In some cases, the machine learning model may be trained to fuse data from multiple types of sensors to generate an output indicating when to increase transmission power. In further examples, the machine learning model may also be trained to take as input an indicator of signal strength, such as an RSSI, as well or instead. In additional examples, information about media being streamed may also be an input into a machine learning model. Training data for a machine learning model may be generated by obtaining user feedback indicative of audio or audiovisual streaming quality for different combinations of sensor data and other inputs. In further examples, training data may be generated by evaluating streaming quality based on performance data captured by a peripheral device.

In additional examples, a machine learning model may be trained to generate an intermediate output which is then processed further to determine when to trigger an increase in transmission power. For instance, the machine learning model may be trained to classify user behavior into one of several classes based on sensor data from one or multiple sensors on a mobile device. Each class of user behavior may then be associated with different outcomes indicating whether to increase transmission power or under what conditions to increase transmission power.

Figure 5:
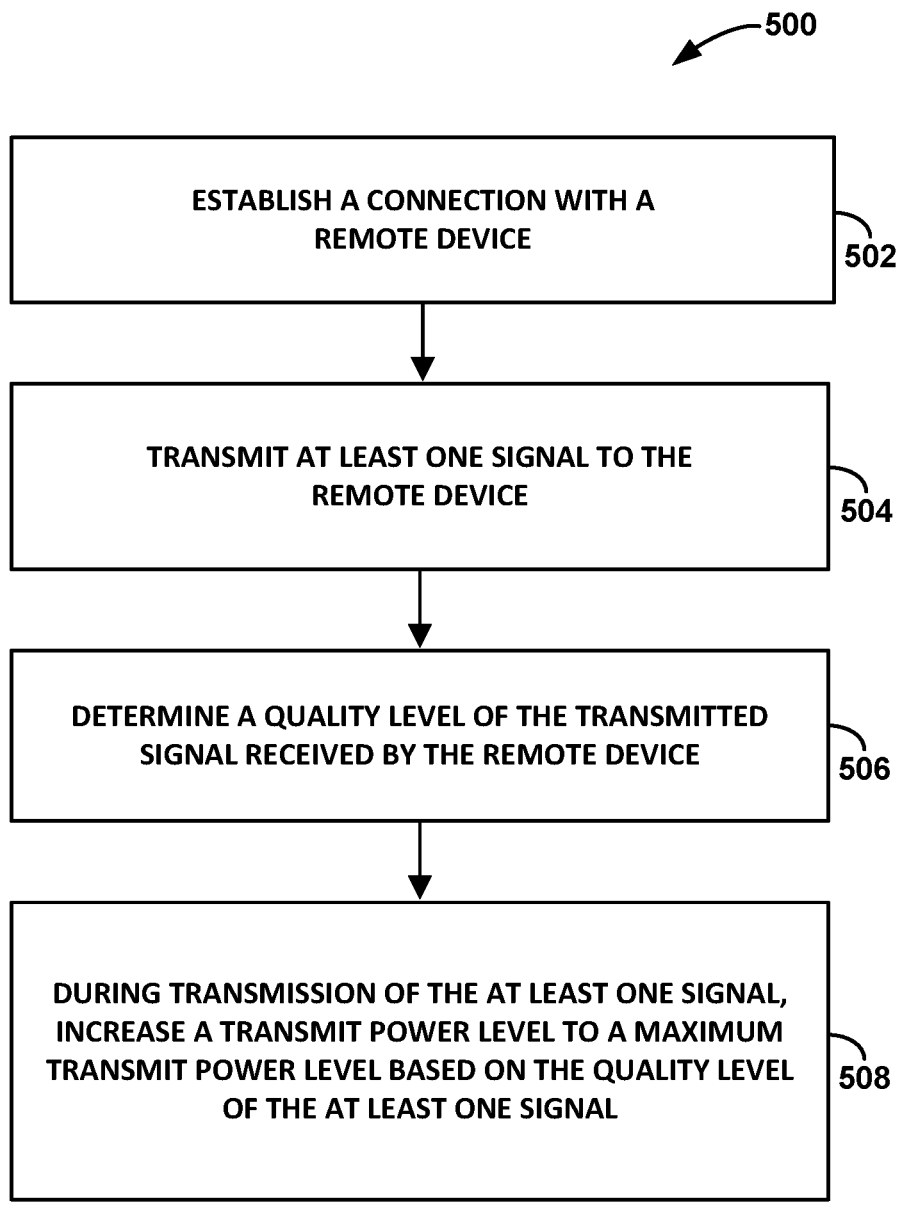
FIG. 5 is a flow chart illustrating a method for selective increase of transmit power by a communication device to a maximum transmit power based on a received signal strength indicator from another communication device according to embodiments of the present disclosure.

FIG. 5 illustrates an example operational flow diagram 500 for a method of controlling the transmit power level of a communication device, in accordance with one embodiment of the present disclosure. The operations 500 shown in FIG. 5 may be executed by one or more communication devices, such as the communication device 102 of FIG. 1. The method of flow diagram 500 may include one or more operations, functions, or activities as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Referring now to FIG. 5, the flow diagram 500 operates from the perspective of a communication device (e.g., a mobile phone), such as the communication device 102 of FIG. 1. At block 502, the communication device may establish a connection or link with a remote or peripheral device over a short-range wireless link or connection, such as a Bluetooth® link. The link may be established according to a handshaking procedure to pair the communication device (e.g., communication device 102 of FIG. 1) with a remote device as described in the Bluetooth® standards. In one example embodiment, the communication device may be a mobile device and the remote device may be a wireless headset. In alternative embodiments, other devices, such as a wireless earpiece, a wireless speaker, and/or a wireless video monitor, may be used to implement the remote device.

At block 504, the communication device may transmit or stream at least one signal to the remote device. The communication device may transmit at least one signal to the remote device once the communication device establishes a connection with the remote device (e.g., via a Bluetooth® connection). The at least one signal may include information (e.g., multimedia information) encoded according to a media format. The media format may include the Bluetooth® A2DP stereo format; however, any high-quality audio encoding formatting format may be alternatively used.

At block 506, the communication device may be configured to determine a quality level of the at least one signal transmitted by the communication device to the remote device. The communication device may transmit the at least one signal (e.g., multimedia signals) to a remote device and the remote device may receive the at least one signal from the communication device. The remote device may evaluate the at least one signal to determine or measure a quality level of the at least one signal. The quality level, for example, may be at least one of an RSSI value, an SINR value, a NACK value, or any other signal quality value. Once the remote device determines the quality level for the at least one signal, the remote device may send a message to the communication device indicative of the quality level of the at least one signal.

At block 508, during the transmission of the at least one signal, the communication device increases the transmit power level (e.g., output power level) of the wireless interface of the communication device to a specified maximum transmit power level for outputting or transmitting signals to the remote device based on the quality level of the at least one signal, such as based on a comparison of the quality level of the at least one signal to a specified quality threshold such that if the quality level is not greater than this threshold, the transmit power is increased to the maximum transmit power level. The communication device may transmit the at least one signal to the remote device. In response, the communication device may receive a message from the remote device indicative of the quality level of the least one signal that was received by the remote device. The communication device may be configured to compare the quality level of the at least one signal received from the remote device to a threshold quality level.

The communication device may adjust the transmit power level of the wireless interface based on the comparison. For example, if the quality level of the at least one signal is equal to or less than the threshold quality level and the at least one signal transmitted to the remote device includes multimedia information, the transmit power level of the communication device may be increased to a maximum transmit power level for transmitting signals to the remote device. By immediately increasing the transmit power level to a maximum transmit power level, the quality of the signals transmitted by the communication device and received by the remote device can be quickly improved. In some implementations, the transmit power level of the communication device may be increased (e.g., increase to a maximum level) based on a signal strength, a battery level or capacity, signal interference, network congestion information, a distance between the communication device and the remote device, or a combination thereof Once the transmit power level of the communication device has been increased to the maximum power transmit level, the communication device may not decrease the transmit power level while the communication device is transmitting or streaming multimedia signals (e.g., audio signals). As such, the communication device may not decrease the transmit power level even though the quality level of the signal received by the remote device is above the threshold quality level. Thus, the communication device may ignore or disregard any messages from the remote device to cause the communication device to decrease the transmit power level. However, in some implementations, if the signal strength (RSSI) of the at least one signal is above a particular value, the communication device may decrease the transmit power level to save power.

In some examples, determining when to trigger an increase in transmission power may involve the application of a machine learning model, such as a neural network. The machine learning model may be trained based on input (e.g., messages) from the remote device about the quality of signals received by the remote device. In some cases, the machine learning model may be trained to increase transmission power based on the type of signal being transmitted and the quality level of signals received by the remote device. For example, information about the type of media signals being streamed may be an input into a machine learning model. In further examples, the machine learning model may be trained based on a signal strength indicator, such as an RSSI, of the signals received by the remote device. Training data for a machine learning model may be generated based on user feedback indicative of streaming quality for different combinations of signals and other inputs.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the activities indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as wireless client devices. The processes and logic flows can be performed by one or more programmable processors and by one or more programmable logic circuitry. General and special-purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application-specific integrated circuits (ASICs) or field-programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, the feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method performed at a communication device, comprising:
    establishing, via a wireless interface, a connection with a remote device based on a short-range wireless communication protocol;
    controlling, by a processor, the wireless interface to transmit signals for receipt by the remote device, the signals comprising information configured according to a media format;
    determining, by the processor, at least one activity mode based on sensor data from one or more sensors of at least one of the communication device or the remote device;
    during transmission of the signals, controlling, by the processor, the wireless interface to directly increase a transmit power level for the signals to a specified maximum transmit power level without incremental increases based on the determined activity mode; and
    in response to directly increasing the transmit power level of the wireless interface to the specified maximum transmit power level, ignoring, by the processor, a request from the remote device to decrease the transmit power level.

2. The method of claim 1, wherein the at least one activity mode includes a mode indicative of at least one of walking, jogging, running, cycling, skiing, or skating.

3. The method of claim 1, wherein the at least one activity mode includes a mode indicating placement of the communication device in a pocket or bag of a user.

4. The method of claim 1, further comprising:
    receiving, via the wireless interface, a signal strength measurement associated with at least one of the signals received by the remote device; and
    wherein controlling the wireless interface to increase the transmit power level to the specified maximum transmit power level is further based on a comparison of the signal strength measurement to a specified signal strength threshold value.

5. The method of claim 4, wherein the signal strength measurement comprises at least one of a Received Signal Strength Indicator (RSSI) value, a Signal to Interference and Noise Ratio (SINR) value, or a Negative Acknowledgment (NACK) value.

6. The method of claim 4, wherein controlling the wireless interface to increase the transmit power level to the specified maximum transmit power level comprises controlling the wireless interface to increase the transmit power level to the specified maximum transmit power level in response to the comparison indicating that the signal strength measurement is not greater than the specified signal strength threshold value.

7. The method of claim 1, wherein the sensor data includes at least one of location data, orientation data, position data, proximity data, velocity data, acceleration data, angular speed data, a battery.

8. The method of claim 7, further comprising:
    determining, by the processor, at least one of orientation information, position information, velocity information, acceleration information, location information, proximity information, angular speed information, battery level information, or network interference information for the communication device based on the sensor data.

9. A method performed at a communication device, comprising:
    establishing, via a wireless interface, a connection with a remote device based on a short-range wireless communication protocol;
    controlling, by a processor, the wireless interface to transmit signals for receipt by the remote device, the signals comprising information configured according to a media format;
    receiving, via the wireless interface, a signal strength measurement associated with at least one of the signals received by the remote device;
    controlling, by the processor, the wireless interface to directly increase a transmit power level of the wireless interface to a specified maximum transmit power level without incremental increases based on a comparison of the signal strength measurement to a specified signal strength threshold value; and
    in response to directly increasing the transmit power level of the wireless interface to the specified maximum transmit power level, ignoring, by the processor, a request from the remote device to decrease the transmit power level.

10. The method of claim 9, wherein controlling the wireless interface to increase the transmit power level to the specified maximum transmit power level comprises controlling the wireless interface to increase the transmit power level to the specified maximum transmit power in response to the comparison indicating that the signal strength measurement is not greater than the specified signal strength threshold value.

11. The method of claim 9, wherein controlling the wireless interface to increase the transmit power level to the specified maximum transmit power level is further based on at least one of network congestion, signal interference, or a battery level.

12. The method of claim 9, further comprising:
    conditioning the control of the wireless interface to increase the transmit power level to the maximum transmit power level based on a battery level of the communication device.

13. The method of claim 9, wherein the remote device comprises at least one of a wireless headset, a wireless earpiece, or a wireless speaker.

14. A communication device, comprising:
    a wireless interface;
    at least one processor coupled to the wireless interface; and
    at least one memory storing executable instructions to manipulate the at least one processor to:
    establish, via the wireless interface, a connection with a remote device based on a short-range wireless communication protocol;
    control the wireless interface to transmit signals for receipt by the remote device, the signals comprising information configured according to a media format;
    determine at least one activity mode based on sensor data from one or more sensors of at least one of the communication device or the remote device;

during transmission of the signals, control the wireless interface to directly increase a transmit power level for the signals to a specified maximum transmit power level without incremental increases based on the determined activity mode; and in response to directly increasing the transmit power level of the wireless interface to the specified maximum transmit power level, ignore a request from the remote device to decrease the transmit power level.

15. The communication device of claim 14, wherein the at least one activity mode includes one of: a mode indicative of at least one of walking, jogging, running, cycling, skiing, or skating; or a mode indicating placement of the communication device in a pocket or bag of a user.

16. The communication device of claim 14, wherein the executable instructions further are to manipulate the at least one processor to:

receive, via the wireless interface, a signal strength measurement associated with at least one of the signals received by the remote device; and wherein controlling the wireless interface to increase the transmit power level to the specified maximum transmit power level is further based on a comparison of the signal strength measurement to a specified signal strength threshold value.

17. The communication device of claim 16, wherein controlling the wireless interface to increase the transmit power level to the specified maximum transmit power level comprises controlling the wireless interface to increase the transmit power level to the specified maximum transmit power level in response to the comparison indicating that the signal strength measurement is not greater than the specified signal strength threshold value.

18. The communication device of claim 14, wherein the information comprises multimedia data, and wherein one or more sensors providing the sensor data include at least one of a light sensor, a gyroscope sensor, an accelerometer, a proximity sensor, or a satellite-based positioning sensor.

19. The communication device of claim 18, wherein at least a portion of the sensor data is sensor data captured by the one or more sensors during at least one activity or motion performed by a user of at least one of the communication device or the remote device.

* * * * *